(12) United States Patent
Johnson

(10) Patent No.: US 6,860,826 B1
(45) Date of Patent: Mar. 1, 2005

(54) CONTINUOUSLY VARIABLE TRANSMISSION WITH TWO PIECE CAM

(75) Inventor: Barry A. Johnson, Roseau, MN (US)

(73) Assignee: Polaris Industries Inc., Medina, MN (US)

(*) Notice: Subject to any disclaimer, the term of this patent is extended or adjusted under 35 U.S.C. 154(b) by 46 days.

(21) Appl. No.: 10/329,047

(22) Filed: Dec. 23, 2002

(51) Int. Cl.[7] .................. F16H 59/04; B60K 17/24
(52) U.S. Cl. ................. 474/19; 474/8; 474/14; 180/376
(58) Field of Search ............... 474/19–21, 12, 474/14, 37; 464/74–76, 83

(56) References Cited

U.S. PATENT DOCUMENTS

| | | |
|---|---|---|
| 3,279,270 A | 10/1966 | Pacak |
| 3,612,014 A | 10/1971 | Tenney |
| 3,616,706 A * | 11/1971 | Shimamoto .................. 474/19 |
| 3,698,497 A | 10/1972 | Bombardier |
| 3,776,354 A | 12/1973 | Duclo et al. |
| 3,893,350 A | 7/1975 | Gingras |
| 3,963,083 A | 6/1976 | Reese |
| 3,967,509 A | 7/1976 | Teal |
| 3,981,373 A | 9/1976 | Irvine |
| 3,985,192 A | 10/1976 | Samuelson et al. |
| 4,069,882 A | 1/1978 | Leonard et al. |
| 4,216,678 A | 8/1980 | Butterfield et al. |
| 4,328,879 A * | 5/1982 | Tone ........................ 464/74 |
| 4,378,221 A | 3/1983 | Huff et al. |
| 4,585,429 A | 4/1986 | Marier |
| 4,592,737 A | 6/1986 | Dhont |
| 5,038,881 A | 8/1991 | Wysocki et al. |
| 5,161,489 A | 11/1992 | Morooka |
| 5,254,041 A * | 10/1993 | Duclo ..................... 474/14 |
| 5,403,240 A * | 4/1995 | Smith et al. .................. 474/8 |
| 5,516,333 A | 5/1996 | Benson |
| 5,538,120 A | 7/1996 | Berardicurti |
| 5,660,245 A | 8/1997 | Marier et al. |
| 5,685,387 A * | 11/1997 | Rioux et al. ................ 180/190 |
| 5,720,681 A | 2/1998 | Benson |
| 5,782,210 A | 7/1998 | Venturoli et al. |
| 5,794,574 A | 8/1998 | Bostelmann et al. |
| 5,964,191 A | 10/1999 | Hata |
| 5,967,286 A * | 10/1999 | Hokanson et al. ...... 192/110 R |
| 6,039,010 A | 3/2000 | Hata |
| 6,044,807 A | 4/2000 | Hata |
| 6,070,683 A * | 6/2000 | Izumi et al. ................ 180/190 |
| 6,086,014 A * | 7/2000 | Bragg, Jr. ..................... 244/2 |
| 6,098,574 A | 8/2000 | Arakawa et al. |
| 6,120,399 A | 9/2000 | Okeson et al. |
| 6,131,477 A * | 10/2000 | Gaydek et al. ............... 464/76 |
| 6,146,295 A | 11/2000 | Mor et al. |
| 6,174,260 B1 | 1/2001 | Tsukada et al. |
| 6,234,119 B1 | 5/2001 | Tsukada et al. |
| 6,237,546 B1 | 5/2001 | Gander |
| 6,379,274 B1 * | 4/2002 | Robert ........................ 474/19 |
| 6,413,178 B1 * | 7/2002 | Chamberland ............... 474/19 |
| 6,569,043 B2 * | 5/2003 | Younggren et al. ........... 474/19 |

* cited by examiner

Primary Examiner—Marcus Charles
(74) Attorney, Agent, or Firm—Allen W. Groenke; Fredrikson & Byron, P.A.

(57) ABSTRACT

A vehicle with a continuously variable transmission (continuously variable transmission) includes a torque responsive clutch having a cam and at least one coupling. The cam has a plurality of projecting surfaces, and a plurality of slots being defined between the projecting surfaces. The slots of the cam are used to direct cam followers that move across the slot surfaces as the vehicle is driven forward or in reverse. As the vehicle adjusts from forward to reverse or vice versa, the cam followers may jump from one side of the slot to the other.

32 Claims, 7 Drawing Sheets

CONTINUOUSLY VARIABLE TRANSMISSION WITH TWO PIECE CAM

RELATED APPLICATIONS

The present application is related to U.S. patent application Ser. No. 10/327,725 entitled "Methods and Apparatus for Providing Reverse Drive in a Recreational Vehicle" by the same inventor and filed on an even date herewith. The entire disclosure of the above mentioned patent application is hereby incorporated by reference.

TECHNICAL FIELD

The present invention relates generally to recreational vehicles. More particularly, the present invention relates to drive systems for use with recreational vehicles.

BACKGROUND OF THE INVENTION

Split sheave continuously variable transmissions (continuously variable transmissions) are used in a variety of recreational type off-road vehicles such as snowmobiles, golf carts, all-terrain vehicles (ATVs), and the like. Continuously variable transmissions, as their name implies, do not require shifting through a series of forward gears, but rather provide a continuously variable gear ratio that automatically adjusts as the vehicle speeds up or slows down, thus providing relatively easy operation for the rider. Typically, continuously variable transmissions are comprised of a drive clutch, a driven clutch, and an endless drive belt disposed about the clutches. The driven clutch includes a pair of opposed sheaves, which together define a generally V-shaped "pulley" within which the drive belt rides. The drive clutch is similarly configured from a pair of opposed sheaves.

SUMMARY OF THE INVENTION

The invention provides a system and method for dampening a continuously variable transmission by utilizing a cam and at least one coupling with a bore extending therethrough. The continuously variable transmission is comprised of a drive clutch, a driven clutch, and an endless drive belt disposed about the drive and driven clutches. Each driven clutch includes a cam, which further includes a plurality of surfaces projecting upward, defining a plurality of slots. Cam followers contact first surfaces of the slots when the continuously variable transmission operates as the off-road vehicle is driven forward. Conversely, the cam followers contact second surfaces of the slots oppositely disposed from the first surfaces when the continuously variable transmission operates in reverse as the off-road vehicle is driven in reverse. The invention helps dampen the sound and impact from a contact between the cam followers and the first or second surfaces of the cam slots, which is a natural occurrence when the vehicle goes from forward to reverse, or vice versa.

This dampening can be accomplished by utilizing a two-part cam, whereby the cam includes a first and second member, each having a plurality of surfaces projecting upward, defining a plurality of slots. The first cam member is inserted and held in place by the inner shell of the second cam member, whereby a plurality of couplings are interposed between the bases of both cam members. The combination of the cam members forms a plurality of narrowed slots having first and second slot surfaces. As the two-part cam is utilized in a driven clutch of a continuously variable transmission, a plurality of cam followers are utilized in the two-part cam, whereby a single cam follower is disposed in every other narrowed slot. When the engine is driving the vehicle in the forward direction, the cam followers engage the first slot surfaces of the narrowed cam slots. As the torque applied to the driven pulley increases, the cam followers roll up these first slot surfaces. However, when these off-road vehicles are operated in reverse, the cam followers stop engaging the first slot surfaces, and instead, jump so as to make contact with the second slot surfaces located opposite the first slot surfaces of the narrowed cam slots. When this slamming occurs, the vehicle operator may hear and feel an impact from the cam followers coming into contact with the second slot surfaces of the narrowed cam slots. However, with the couplings located between the first and second cam members, there is a reduced force transfer from the first cam member to the second cam member upon switching between forward and reverse.

BRIEF DESCRIPTION OF THE DRAWINGS

FIG. 6 is a perspective view of a cam 632 in accordance with an additional exemplary embodiment of the present invention.

FIG. 7 is an exploded perspective view of a cam 732 in accordance with an exemplary embodiment of the present invention.

DETAILED DESCRIPTION OF THE INVENTION

Figure 1:
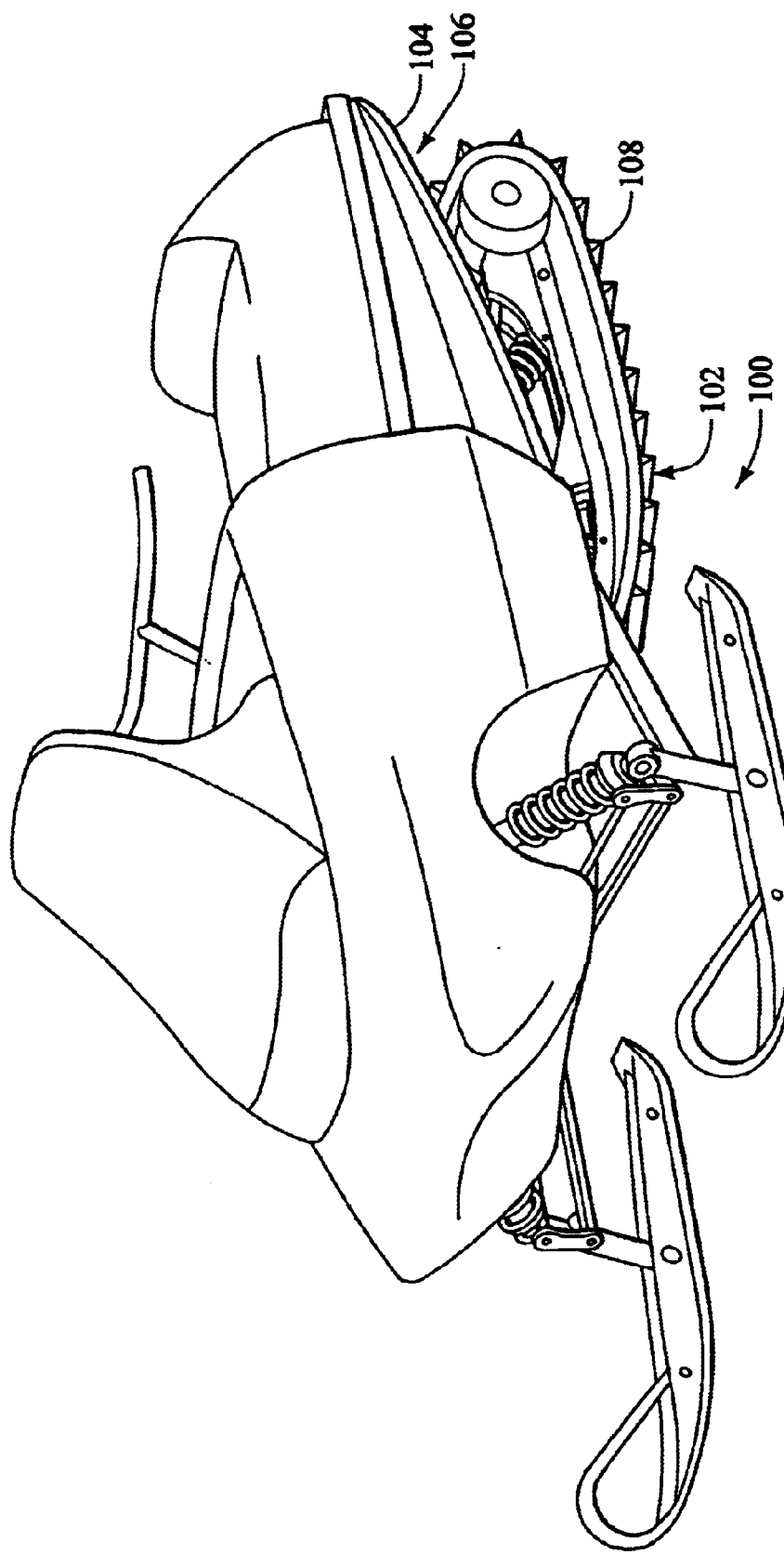
FIG. 1 is a perspective view of a snowmobile including a drive system in accordance with an exemplary embodiment of the present invention.

The following detailed description should be read with reference to the drawings, in which like elements in different drawings are numbered identically. The drawings, which are not necessarily to scale, depict selected embodiments and are not intended to limit the scope of the invention. Accordingly, it is to be understood that the invention is not limited in its application to the details of construction and the arrangements of components set forth in the following description or illustrated in the drawings.

FIG. 1 is a perspective view of a snowmobile 100 including a drive system 102 in accordance with an exemplary embodiment of the present invention. Snowmobile 100 has a chassis 104 defining a tunnel 106. In the embodiment of FIG. 1, a drive track 108 can be seen extending from tunnel 106. In the embodiment of FIG. 1, drive track 108 comprises an endless loop that is supported by a rear suspension. In a preferred embodiment, drive track 108 is operatively connected to an engine by a drivetrain so that drive track 108 may be used to propel snowmobile 100. In some embodiments of the present invention drive track 108 maybe used to propel snowmobile 100 in both a forward direction and a reverse direction. In FIG. 1, it may also be appreciated that snowmobile 100 includes a plurality of skis. Although a snowmobile is illustrated in FIG. 1, it is to be appreciated that a drive system in accordance with the present invention may be used in conjunction with various types of vehicles. Examples of such vehicles include ATVs, golf carts and the like.

Figure 2:
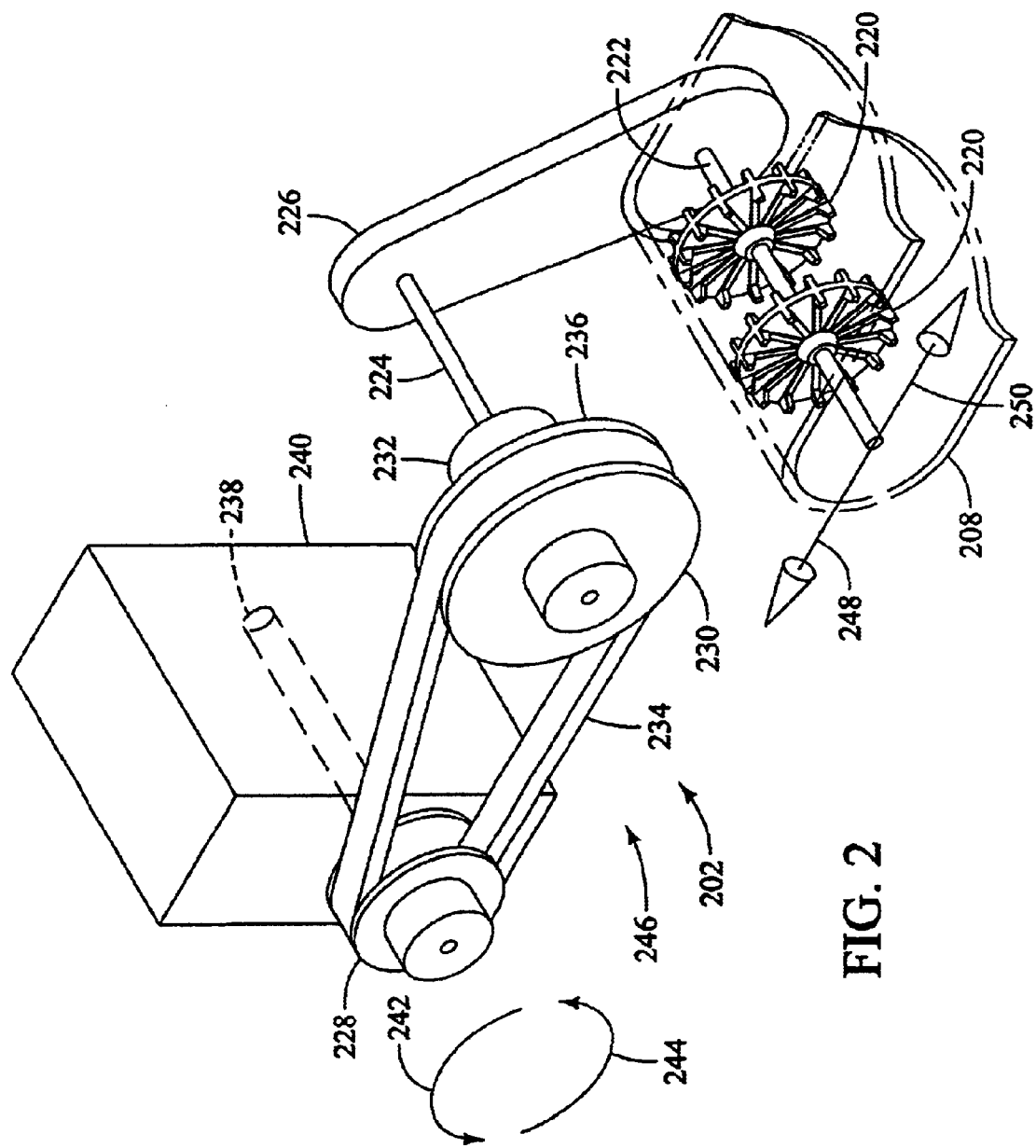
FIG. 2 is a perspective view of a drive system in accordance with an exemplary embodiment of the present invention.

FIG. 2 is a perspective view of a drive system 202 in accordance with an exemplary embodiment of the present invention. Drive system 202 of FIG. 2 may be used, for example, to propel a snowmobile such as the one illustrated in the previous figure. Drive system 202 includes a drive track 208 that is illustrated using phantom lines in FIG. 2. Drive track 208 may be driven by two drive sprockets 220 that are fixed to a drive shaft 222. Drive shaft 222 is preferably adapted to be used to urge motion of drive track 208, such that drive shaft 222 and drive track 208 propel a vehicle.

Drive system 202 of FIG. 2 also includes a jack shaft 224. In the embodiment of FIG. 2, jack shaft 224 and drive shaft 222 are connected to one another by a speed reduction mechanism 226. In a preferred embodiment, speed reduction mechanism 226 is configured to provide a desired reduction in rotational velocity. Speed reduction mechanism 226 may comprise various elements without deviating from the spirit and scope of the present invention. Examples of elements which may be suitable in some applications include gears, sprockets, belts and chains.

A driven clutch 230 is connected to jack shaft 224 in the embodiment of FIG. 2. Driven clutch 230 includes a cam 232 that can be seen extending beyond a sheave 236 of driven clutch 230. Driven clutch 230 is connected to a drive clutch 228 by a drive belt 234. In the embodiment of FIG. 2, drive clutch 228 is fixed to a crankshaft 238 of an engine 240. Crankshaft 238 is illustrated using dashed lines in FIG. 2. In a preferred embodiment, engine 240 is capable of rotating crankshaft 238 in both a first rotational direction 242 and a second rotational direction 244.

With reference to FIG. 2, it may be appreciated that rotation of crankshaft 238 is transferred via a drivetrain 246 to drive-shaft 222 so as to cause rotation of drive shaft 222. In the embodiment of FIG. 2, drivetrain 246 comprises drive clutch 228, drive belt 234, driven clutch 230, jack shaft 224, and speed reduction mechanism 226. Drive shaft 222 causes movement of drive track 208 such that drive track 208 propels a vehicle. When crankshaft 238 is rotated in a first rotational direction 242 vehicle is propelled in a forward direction 248. When drive shaft 222 is rotated in a second rotational direction 244, vehicle is propelled in a reverse direction 250.

Figure 3:
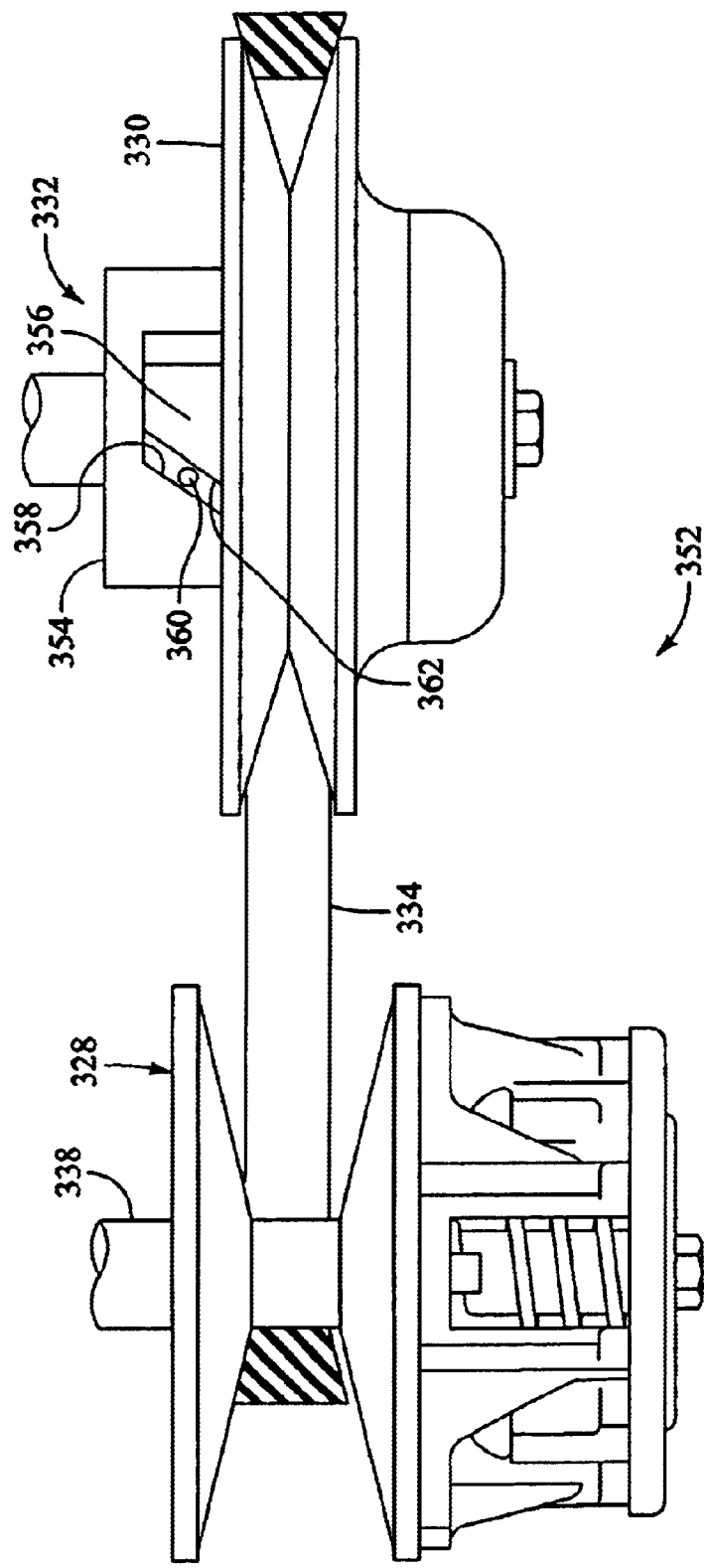
FIG. 3 is a plan view of a continuously variable transmission in accordance with an exemplary embodiment of the present invention.

FIG. 3 is a plan view of a continuously variable transmission 352 in accordance with an exemplary embodiment of the present invention. Continuously variable transmission 352 includes a drive clutch 328, a driven clutch 330, and an endless drive belt 334 disposed about the drive clutch 328 and driven clutch 330. Driven clutch 330 includes a pair of opposed sheaves which together define a generally V-shaped "pulley" within which drive belt 334 rides. One of the sheaves is axially movable (i.e., movable in the direction parallel to the axis of driven clutch 330), and the other sheave is axially stationary.

Continuously variable transmission 352 includes a cam 332 that is preferably adapted to urge the sheaves of driven clutch 330 toward one another. In the embodiment of FIG. 3, cam 332 comprises a first cam member 354 and a second cam member 356. In the embodiment of FIG. 3, cam 332 comprises a first cam member 354 and a second cam member 356. As shown in FIG. 3, first cam member 354 of cam 332 includes a first cam surface 358 that contacts a cam follower 360 when a crankshaft 338 of continuously variable transmission 352 is turning in a first direction. Also as shown in FIG. 3, second cam member 356 of cam 332 includes a second cam surface 362 that contacts cam follower 360 when crankshaft 338 is turning in a second direction. Drive clutch 328 comprises a pair of opposed sheaves, one being axially movable and the other being axially stationary.

Figure 4:
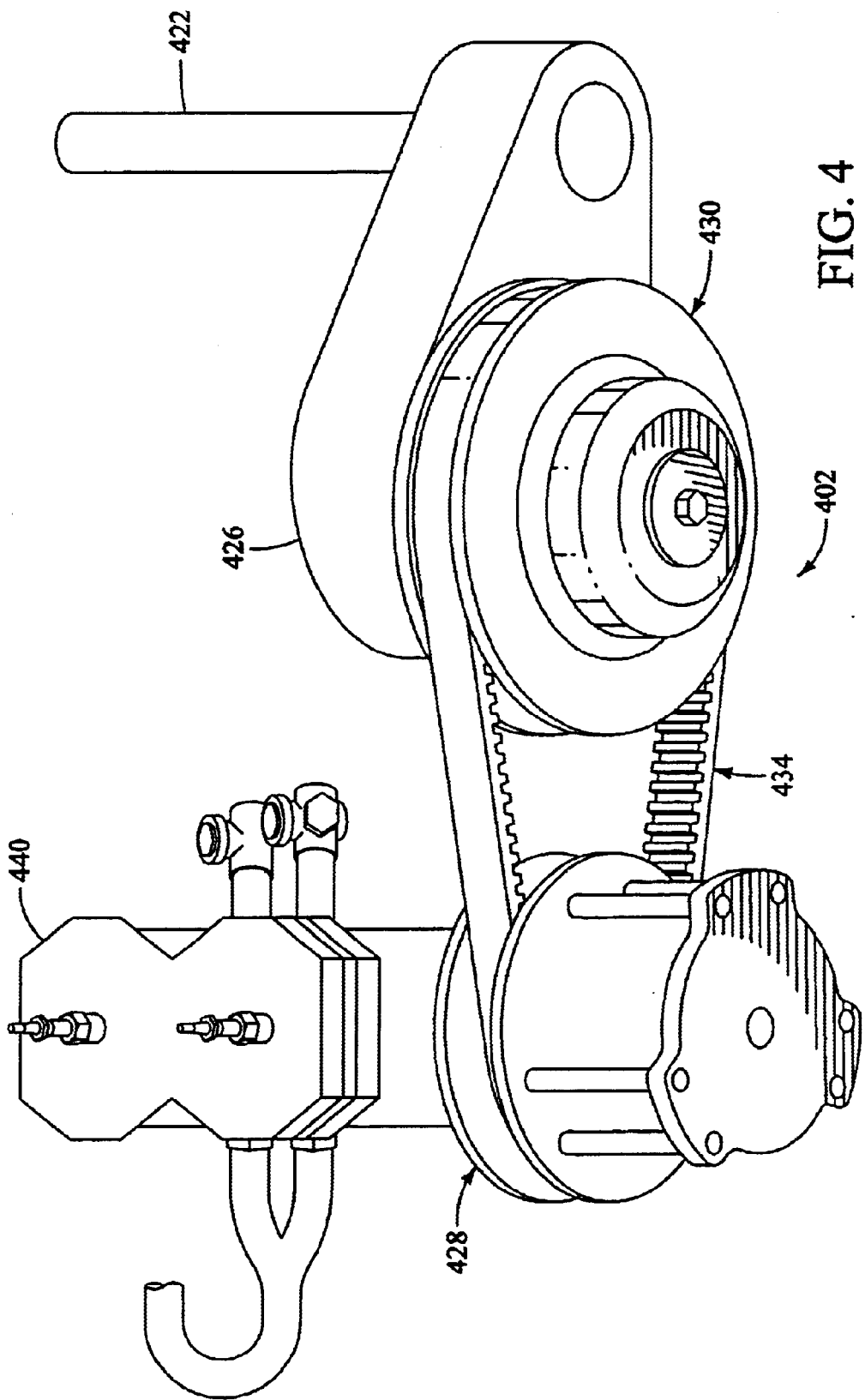
FIG. 4 is a perspective view of a drive system in accordance with an additional exemplary embodiment of the present invention.

FIG. 4 is a perspective view of a drive system 402 in accordance with an additional exemplary embodiment of the present invention. Drive system 402 of FIG. 4 includes an engine 440 and a drive clutch 428 that is fixed to a crankshaft of engine 440. In a preferred embodiment, engine 440 is capable of rotating the crankshaft in both a first direction and a second direction that is different from the first direction. Various methods and apparatus may be used to rotate the crankshaft in a first direction and a second direction without deviating from the spirit and scope of the present invention. Examples of methods and apparatus that may be suitable in some applications can be found in U.S. Pat. Nos. 5,161,489; 5,782,210; 5,794,574; 5,964,191; 6,039,010; 6,044,807; 6,098,574; 6,234,119; and 6,237,546. The entire disclosure of each of these U.S. Patents is herby incorporated by reference.

Drive clutch 428 is connected to a driven clutch 430 by a drive belt 434. Driven clutch 430 is connected to a drive shaft 422 by a speed reduction mechanism 426. In a preferred embodiment, speed reduction mechanism 426 is configured to provide a desired reduction in rotational velocity. Speed reduction mechanism 426 may comprise various elements without deviating from the spirit and scope of the present invention. Examples of elements which may be suitable in some applications include gears, sprockets, belts and chains.

Figure 5:
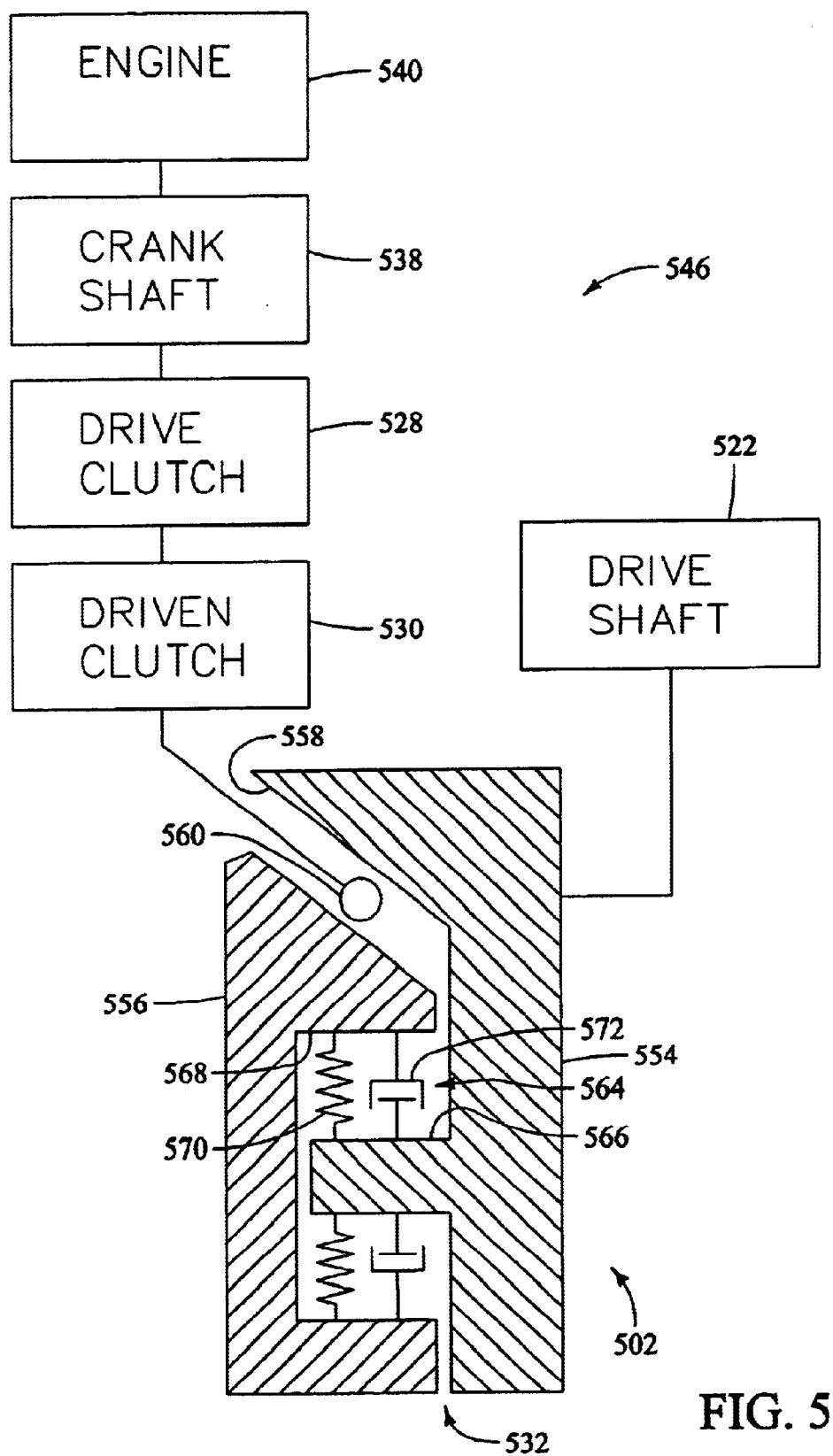
FIG. 5 is a diagrammatic illustration of a drive system in accordance with an additional exemplary embodiment of the present invention.

FIG. 5 is a diagrammatic illustration of a drive system 502 in accordance with an additional exemplary embodiment of the present invention. Drive system 502 includes an engine 540. In the exemplary embodiment of FIG. 5, engine 540 is capable of rotating a crankshaft 538 in a first direction and a second direction. Crankshaft 538 of engine 540 is connected to a drive shaft 522 via a drivetrain 546. In the embodiment of FIG. 5, drivetrain 546 includes a drive clutch 528, a driven clutch 530, a cam 532, and a cam follower 560. In the embodiment of FIG. 5, cam 532 comprises a first cam member 554 and a second cam member 556. As shown in FIG. 5, first cam member of cam 532 includes a first cam surface 558 that contacts a cam follower 560 when cam 532 is turning in a first direction. Also as shown in FIG. 5, second cam member 556 of cam 532 includes a second cam surface 562 that contacts cam follower 560 when cam 532 is turning in a second direction.

In FIG. 5, it may be appreciated that a coupling 564 extends between a coupling portion 566 of first cam member 554 and a coupling portion 568 of second cam member 556. In some advantageous embodiments of the present invention, coupling 564 is capable of absorbing shock when the rotation of the crankshaft 538 is changed from the first direction to the second direction or from the second direction to the first direction. In the embodiment of FIG. 5, coupling 564 comprises a spring 570 and a damper 572.

Figure 6:
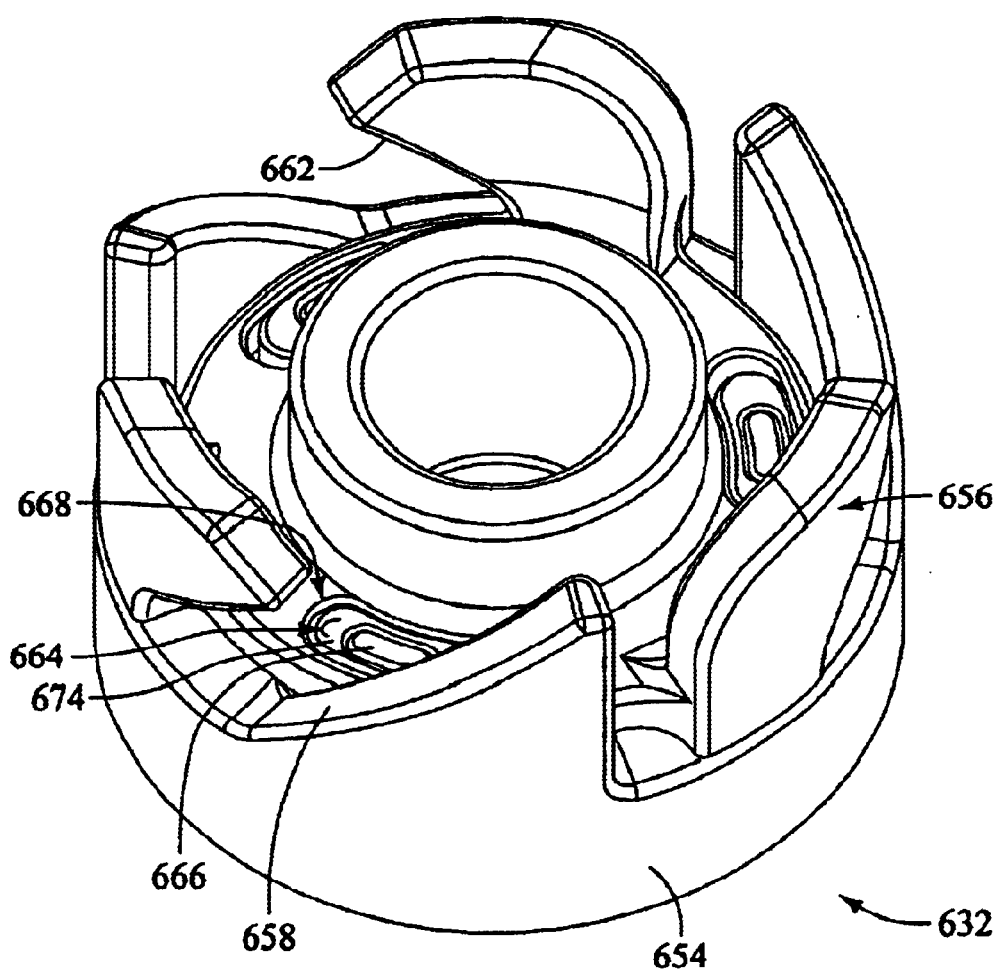
FIG. 6 is a perspective view of a cam in accordance with an additional exemplary embodiment of the present invention.

FIG. 6 is a perspective view of a cam 632 in accordance with an additional exemplary embodiment of the present invention. Cam 632 of FIG. 6 comprises a first cam member 654 and a second cam member 656. As shown in FIG. 6, first cam member 654 of cam 632 includes a first cam surface 658 that is preferable dimensioned to contact a cam follower when cam 632 is turning in a first direction. Also as shown in FIG. 6, second cam member 656 of cam 632 includes a second cam surface 662 that is preferably dimensioned to contact a cam follower when cam 632 is turning in a second direction.

In FIG. 6, it may be appreciated that cam 632 comprises a plurality of couplings 664. In the embodiment of FIG. 6, each coupling 664 includes a coupling portion 666 of first cam member 654, a coupling portion 668 of second cam member 656, and an intermediate member 674. In the embodiment of FIG. 6, intermediate member 674 extends between coupling portion 666 of first cam member 654 and coupling portion 668 of second cam member 656. In some advantageous embodiments of the present invention, coupling 664 is capable of absorbing shock when the rotation of cam 632 is changed from a first direction to a second direction or from the second direction to the first direction.

In some useful embodiments of the present invention, intermediate member 674 comprises a reversibly deformable material. For example, intermediate member 674 may comprise an elastomeric material. The term elastomeric generally refers to a rubberlike material (e.g., a material which can experience about a 7% deformation and return to the undeformed configuration). Examples of elastomeric materials include rubber (e.g., natural rubber, silicone rubber, nitrile rubber, polysulfide rubber, etc.), thermoplastic elastomer (TPE), butyl, polyurethane, and neoprene.

Figure 7:
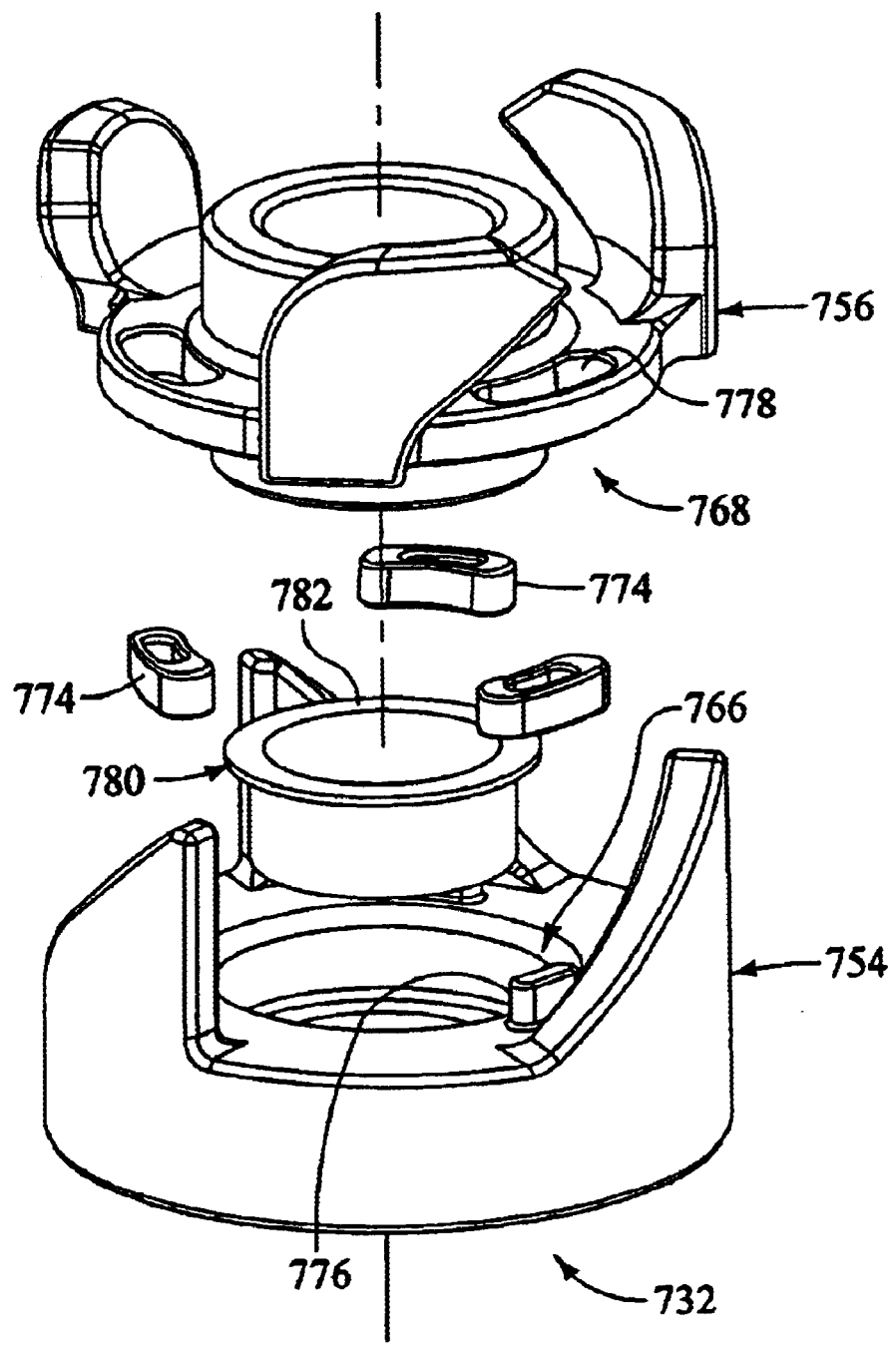
FIG. 7 is an exploded perspective view of a cam in accordance with an exemplary embodiment of the present invention.

FIG. 7 is an exploded perspective view of a cam 732 in accordance with an exemplary embodiment of the present invention. In FIG. 7, it may be appreciated that a first coupling portion 766 of first cam member 754 comprises a tang 776. In FIG. 7, it may also be appreciated that a second coupling portion 768 of second cam member 756 comprises a slot 778. A plurality of intermediate members 774 are visible in FIG. 7. In the embodiment of FIG. 7, first cam member 754 and second cam member 756 are dimensioned so that they can be joined together with intermediate member 774 interposed between first coupling portion 766 of first cam member 754 and second coupling portion 768 of second cam member 756.

A bushing 780 is also visible in FIG. 7. In the embodiment of FIG. 7, bushing 780 comprises of a flange 782 on its upper end and a bore extending there-through. A lower end of the bushing 780 may be inserted mounted into a central bore extending through first cam member 754. In some embodiments of the present invention, a portion of second cam member 756 may be inserted into the bore defined by bushing 780. The intermediate member 774 slides around and over tang 776 of coupling portion 766 of the second cam member 756, such that when the first cam member 754 and the second cam-member 756 are adjoined, the coupling portion 766 of the first cam member 754 slides over and around the outer extent of intermediate member 774.

The complete disclosures of all patents, patent applications, and publications are hereby incorporated by reference as if individually incorporated. Having thus described the various exemplary embodiments of the present invention, those of skill in the an will readily appreciate that yet other embodiments may be made and used within the scope of the claims hereto attached. Thus, it is to be understood that this disclosure is, in many respects, only illustrative. Changes may be made in details, particularly in matters of shape, size, and arrangement of parts without exceeding the invention's scope which is, of course, defined in the language in which the appended claims are expressed.

What is claimed is:

1. A vehicle comprising:
   an engine capable of rotating a crankshaft in a first direction and a second direction;
   a drivetrain coupling the crankshaft of the engine to a drive shaft of the vehicle;
   the drivetrain comprising a cam having a first cam member and a second cam member;
   the first cam member including a first cam surface which contacts a cam follower when the crankshaft is turning in the first direction;
   the second cam member including a second cam surface which contacts the cam follower when the crankshaft is turning in the second direction;
   a coupling linking a first cam member of the drivetrain to a second cam member;
   the coupling absorbing shock when a rotational direction of the crankshaft is changed from the first direction to the second direction or from the second direction to the first direction; and
   wherein the coupling comprises a sleeve having an inner surface dimensioned to engage a coupling portion of the first cam member and an outer surface dimensioned to engage a coupling portion of the second cam member.

2. The cam according to claim 1, wherein the coupling provides for relative rotation between the first cam member and the second cam member.

3. The cam according to claim 2, wherein the relative rotation between the first cam member and the second cam member is limited to a predetermined magnitude.

4. The vehicle according to claim 1, wherein the coupling portion of the first cam member comprises a slot.

5. The vehicle according to claim 1, wherein the coupling portion of the second cam member comprises a tab.

6. The vehicle according to claim 1, wherein the sleeve comprises an elastomeric material.

7. The vehicle according to claim 6, wherein the elastomeric material comprises a polyurethane.

8. The vehicle according to claim 1, wherein the coupling is capable of damping shock.

9. The vehicle according to claim 1, wherein the coupling is capable of assuming a compressed shape while absorbing shock.

10. The vehicle according to claim 1, further including a bushing interposed between the first cam member and the second cam member.

11. A cam for use in a torque-responsive clutch comprising:
   a first cam member;
   a second cam member; and
   a coupling extending between a coupling portion of the first cam member and a coupling portion of the second cam member;
   the coupling absorbing shock when a rotational direction of the cam is changed from a first direction to a second direction or from the second direction to the first direction; and
   wherein the coupling comprises a sleeve having an inner surface dimensioned to engage a coupling portion of the first cam member and an outer surface dimensioned to engage a coupling portion of the second cam member.

12. The cam according to claim 11, wherein the coupling provides for relative rotation between the first cam member and the second cam member.

13. The cam according to claim 12, wherein the relative rotation between the first cam member and the second cam member is limited to a predetermined magnitude.

14. The cam according to claim 11, wherein the coupling portion of the first cam member comprises a slot.

15. The cam according to claim 11, wherein the coupling portion of the second cam member comprises a tab.

16. The cam according to claim 11, wherein the sleeve comprises an elastomeric material.

17. The cam according to claim 16, wherein the elastomeric material comprises a polyurethane.

18. The cam according to claim 11, wherein the coupling is capable of damping shock.

19. The cam according to claim 11, wherein the coupling comprises a reversibly deformable material and the coupling is capable of assuming a deformed shape while absorbing shock.

20. The cam according to claim 11, further including a bushing interposed between the first cam member and the second cam member.

21. The cam according to claim 11, further including a bushing that is received within a central aperture of the first cam member;

the bushing having a lumen dimensioned to receive a portion of the second cam member.

22. The cam according to claim 11, wherein:

the first cam member includes a first cam surface which contacts a cam follower when the cam is turning in the first direction;

the second cam member including a second cam surface which contacts the cam follower when the cam is turning in the second direction.

23. A torque-responsive clutch comprising:

a cam including a first cam member and a second cam member;

at least one cam follower coupled to a sheave;

the at least one cam follower selectively engaging the first cam member and the second cam member;

a coupling extending between a coupling portion of the first cam member and a coupling portion of the second cam member;

the coupling absorbing shock when a rotational direction of the sheave is changed from a first direction to a second direction or from the second direction to the first direction; and wherein the coupling comprises a sleeve having an inner surface dimensioned to engage a coupling portion of the first cam member and an outer surface dimensioned to engage a coupling portion of the second cam member.

24. The clutch according to claim 23, wherein the coupling provides for relative rotation between the first cam member and the second cam member.

25. The clutch according to claim 24, wherein the relative rotation between the first cam member and the second cam member is limited to a predetermined magnitude.

26. The clutch according to claim 23, wherein the coupling portion of the first cam member comprises a slot.

27. The clutch according to claim 23, wherein the coupling portion of the second cam member comprises a tab.

28. The clutch according to claim 23, wherein the sleeve comprises an elastomeric material.

29. The clutch according to claim 28, wherein the elastomeric material comprises a polyurethane.

30. The clutch according to claim 23, wherein the coupling is capable of damping shock.

31. The clutch according to claim 23, wherein the coupling comprises a reversibly deformable material and the coupling is capable of assuming a deformed shape while absorbing shock.

32. The cam according to claim 23, further including a bushing interposed between the first cam member and the second cam member.

* * * * *